Sept. 13, 1960  K. SCHURR  2,952,424
AUTOMATIC STEERING MECHANISM FOR AIRCRAFT
Filed March 3, 1955
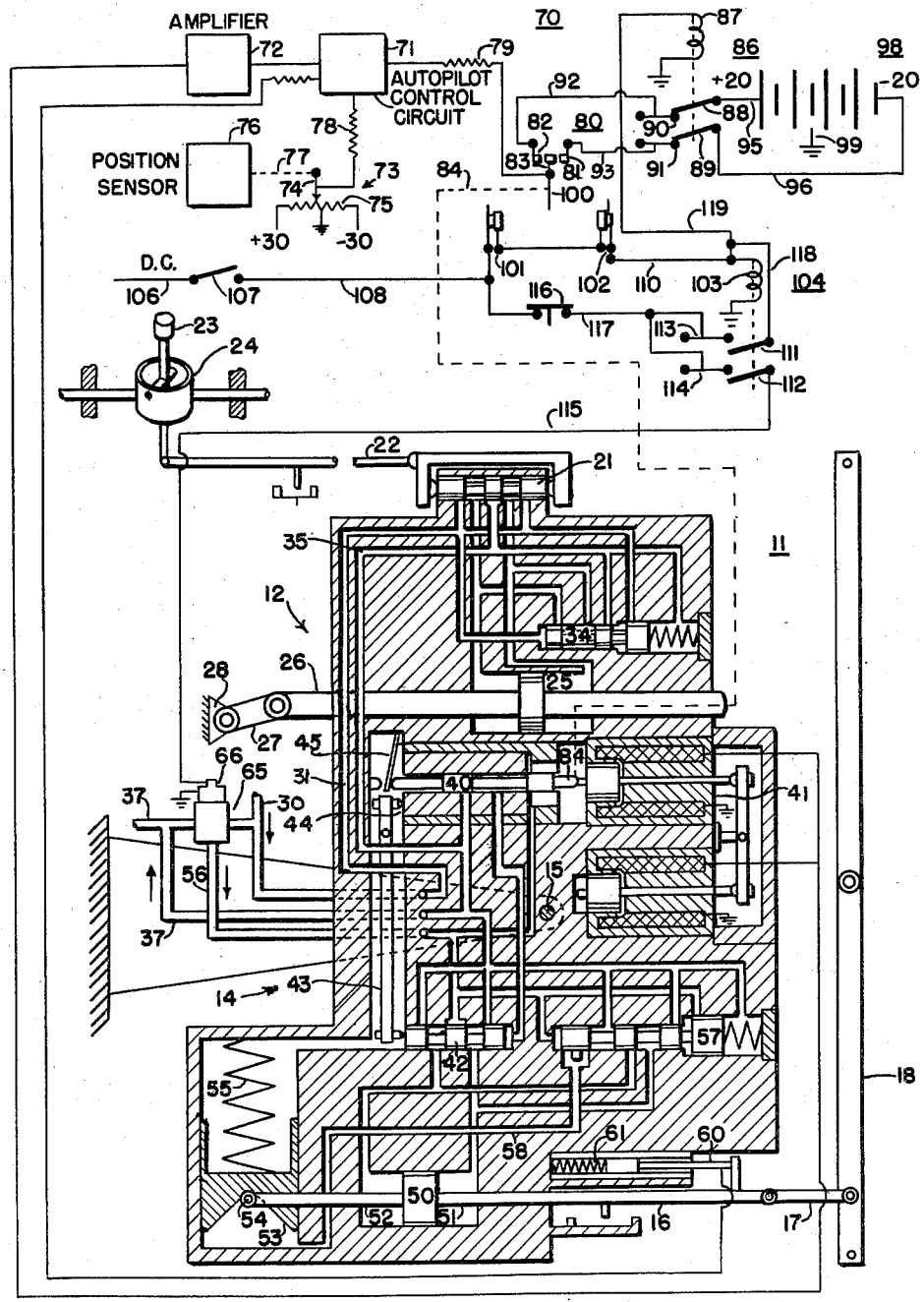
INVENTOR.
KARL SCHURR
BY Gordon Reed
ATTORNEY United States Patent Office 2,952,424
Patented Sept. 13, 1960

2,952,424

AUTOMATIC STEERING MECHANISM FOR AIRCRAFT

Karl Schurr, Minneapolis, Minn., assignor to Minneapolis-Honeywell Regulator Company, Minneapolis, Minn., a corporation of Delaware Filed Mar. 3, 1955, Ser. No. 491,847

19 Claims. (Cl. 244—77)

The present invention relates to a system for the flight control of a dirigible aircraft and more particularly to the provision of automatic control of the craft through such system.

The invention in its broader aspects relates to a novel arrangement for conditioning the automatic control apparatus in preparation for its engagement with the system for the subsequent automatic control of the craft. It has been heretofore purposed to provide an auxiliary servo mechanism which may be alternatively coupled to the controller of the main servo mechanism to synchronize the automatic apparatus with the attitude of the craft so that upon engagement of the automatic apparatus and the main servo mechanism with the aircraft control surfaces no sudden operation or change in attitude of the craft will result.

It is an object of this invention to dispense with such auxiliary servo mechanism and thus decrease the total weight of the apparatus while retaining some of the advantages of such auxiliary mechanism.

An object of this invention is to limit for a preliminary period the travel of an operable controller for a main servo mechanism. Such travel may be an oscillation having two limited movements, one movement is in a direction, during actual servo control subsequent to the preliminary period, to effect operation of the main servo mechanism, the reverse movement is such as to terminate operation of the main servo mechanism. Confirming the operation of the controller within such limits is a prerequisite to initiation of automatic control of the servomechanism after the preliminary period. An oscillation may be aperiodic.

A further object of this invention is to prevent the introduction of control of the main servo mechanism from such controller should the displacement of the controller during any movement of an oscillation be of beyond a predetermined extent.

A further object of this invention is to provide a craft control system which includes a differential hydraulic type servo motor having a manually operable control valve and an autopilot operable control valve with interlocks to prevent initial control of said servo motor from said autopilot operable control valve should it be displaced beyond a limited position at the time it is desired to introduce automatic or autopilot control.

A further object of the present invention is to provide a differential automatic pilot system for a dirigible craft having a selective manual control provision and arranged so that such manual control may be supplemented by automatic control and wherein such differential autopilot includes a hydraulic differential servo motor having an automatic control system responsive displaceable control valve, with interlocks related to the initial displacement of said valve to thereby monitor or condition the system for the automatic operation of said differential motor so that such supplemental control may be effected without violent change of craft attitude.

The above and further objects of the invention as well as the manner in which such may be attained will be evident from a consideration of the following description taken in connection with the accompanying drawings showing one embodiment thereof.

The sole figure of the drawing is a general schematic illustration of a differential autopilot including an automatic pilot section to which a safety operator of the present invention for monitoring the displacement of the control valves of such section is applied.

In differential flight control systems for a dirigible craft, and particularly such utilizing a differential hydraulic servomotor such system may provide for manual control which may be supplemented by automatic control. In a system utilizing a differential hydraulic servomotor, a control valve on one section of the servomotor may be manually positioned and a control valve in the other section thereof may be automatically positioned from a stabilizing means or automatic pilot. Before supplementing the manual control with the automatic control however, the position of the control valve of the automatic pilot section is monitored in order to precondition this section prior to the institution of the automatic control. If the control valve in the automatic section were in one extreme position, and if automatic control were initiated while the valve was so displaced, the attitude of the craft would be abruptly altered by the operation of the attitude changing means from the servomotor. In the present arrangement safety devices have been provided so that if the control valve is initially displaced from its neutral position, due to an attitude of the craft causing the operation of the valve controller seeking to correct for such attitude, a compensating control is introduced so that the control valve will have its movement reversed to decrease its displacement from its neutral position. Such reversal is obtained by causing the displacement of the control valve at one position of its displacement to introduce a signal of a fixed amount normally sufficient to cause reversal of the valve movement.

However if such fixed signal is less than the attitude responsive signal with such difference causing a further displacement of the valve from its neutral position, the monitoring arrangement operates safety devices to prevent the application of automatic control on the second section of said servomotor.

Referring to the drawing, the control system for the dirigible craft comprises a hydraulic differential servomotor 11 having a manually controlled section 12 and an automatically controlled section 14. The servomotor 11 having the sections 12 and 14 integral has a pivot 15. The rotation of this servomotor 11 about pivot 15 is communicated through a servo output member 16 and connecting link 17 to one end of a pivoted arm 18. The opposite end of arm 18 may be connected to the attitude controlling means of a dirigible craft. The manually controlled section 12 has a slidable control valve 21 having three lands which may be displaced in either direction from a normal position by operable means 22 connected thereto and extending from a conventional control column 23 of the dirigible craft. The control column 23 may be suitably supported in a cross gimbal arrangement 24 for universal movement. The section 12 includes a power piston 25 having its rod 26 connected by means of link 27 to a bracket 28 fixed to the craft. Since the power piston is held against movement, operation of the control valve 21 to admit a fluid under pressure to either side of piston 25 will cause rotation of the two integral sections 12 and 14 about pivot 15 and with the valve 21 held a follow up action on valve 21 by its housing is provided. The opposite sides of the power piston 25 are placed in communication with each other by suitable fluid conduits and unoperated valve 34, shown in partially operated position. When the operating fluid pressure falls to a low value, the valve 34 as will be described moves to its extreme left or unoperated position.

Supply pressure for the manually controlled section 12 is obtained through a main conduit 30 which connects with a pressure conduit 31 which in turn has subconnections leading to the control valve 21. Upon presence of pressure in conduit 31, the pressure is transmitted through suitable conduits to the left end of valve 34 moving it to its rightward position whereby the communication between the opposite sides of power piston 25 is interrupted. The exhaust fluid from the power piston 25 is transmitted by conduit 35 in motor section 12 to the main exhaust line 37.

The autopilot section 14 includes a pilot valve 40, having two lands, which may be positioned by a motor 41. The valve 40 includes a spring 45 which opposes the efforts of motor 41 to displace the valve in either direction. The pilot valve 40 controls the positioning of a control valve 42 in the autopilot section 14. The valve 42 has three lands. Displacement of the pilot valve 40 interrupts the balance in pressure applied to the opposing ends of a pivoted arm 43 having one end engaged with the control valve 42 and its opposite end abutting a sleeve 44 surrounding the pilot valve 40. In normal position of the pilot valve 40, supply pressure is applied to the right end of the sleeve 44 but the two lands block off communication of the space between the lands and pressure line 56 and exhaust line 37. Should the sleeve 44 be moved to the left, supply pressure passes through the space and to the right end of valve 42. Thus the pressure on the right end of sleeve 44 surrounding valve 40 which is applied to the top end of the pivoted arm 43 is countered by an opposing pressure supplied to the right end of control valve 42 and thus through valve 42 to the lower end of arm 43 to reposition the sleeve. Alternatively, it may be seen that when the pilot valve 40 is displaced from its normal position a pressure unbalance on arm 43 causes a follow up action to occur so that the pressures are equalized on opposite ends of the arm 43.

The control valve 42 controls the operation of a power piston 50 within the power cylinder 51 of the autopilot section 14. The power piston 50 includes the connecting rod 16 connected to link 17. The opposite side of piston 50 includes a longitudinally extending rod 52 having a follower 54 thereon which engages with a V-shaped block 53 movable transverse to rod 52 by a spring 55 to normally center the power piston 50 in cylinder 51 on failure of fluid pressure. Supply pressure for the autopilot section 14 is obtained from a secondary supply line 56 which supplies pressure to valves 40, 42, and to the left end of a valve 57 normally connecting the ends of cylinder 51 and through a further conduit 58 to the V-block 53 to release the rod 52 of power piston 50. The operation of the valve 57 from the pressure fluid interrupts the communication between the portions of cylinder 51 on opposed sides of the piston 50.

Relative movement of the piston 50 within cylinder 51 effects the relative displacement of a potentiometer slider 60 relative to a potentiometer resistor 61 to provide a follow up or rebalance signal for the autopilot operation of section 14.

A three way solenoid valve 65 is provided to connect the primary supply line 30 with the secondary supply line 56 or alternatively connect the secondary supply line 56 with the exhaust line 37. The operating means 66 of the solenoid valve 65 will be energized under conditions stated below to place in communication the main supply line 30 and secondary supply line 56.

The differential hydraulic servomotor as thus far described is not a novel element herein has been previously disclosed in a prior application of Benjamin H. Ciscel, Serial No. 431,862, filed May 24, 1954. The novelty herein is primarily in conditioning the autopilot section 14 of the motor prior to permitting the section 14 to operate its power piston 50. The autopilot section includes a control arrangement 70 of the follow up type. The follow up arrangement includes an autopilot control circuit 71 of the balanceable type which controls an amplifier 72. The amplifier 72 in turn controls the operation of motor 41 which positions the pilot valve 40. The operation of the valve 40 during autopilot control effects the operation of the power piston 50 relative to power cylinder 51 whereby a follow up signal is developed by potentiometer elements 60, 61 which in turn is supplied back to the control circuit 71 to effect a rebalance thereof. The motor 41 exerts a variable force on control valve 40 tending to move it, in accordance with the magnitude and phase of the unbalance signal in the control circuit 71. This force from the motor 41 is opposed by the restraining spring 45 so that a displacement of the pilot valve proportional to the unbalance of control circuit 71 is provided.

The control circuit, amplifier, motor combination herein may be similar to that disclosed in the aforesaid application of Benjamin H. Ciscel wherein the motor is similar to the positioning means for valve 109 of the aforesaid application, the amplifier 72 similar to the amplifier 160 of the application, and the control circuit and connections to the amplifier being of a type similar to the control circuit for the aforesaid amplifier with the exception that the trim signal generator 218 of the aforesaid application has been omitted herein and the output of the amplifier 72 is always applied to the motor 41.

The control circuit 71 includes a plurality of sources of control signals one of them indicated as a potentiometer type pick-off 73 on adjustable slider 74 and a resistor 75 having a grounded center tap. The slider 74 is positioned in either direction along resistor 75 from the center tap thereof by a position sensor 76 through a suitable operating means 77. A summing resistor 78 connects slider 74 to the control circuit 71. A summing resistor 79 for a synchronizing signal generator 80, developing a step or fixed output, is also connected to the control circuit 71. The signal generator 80 comprises a pair of opposed contacts, 81, 82 and a displaceable contact arm 83 coacting therewith. The arm 83 is displaced into engagement with contact 81 or 82 through an operating means 84. The operating means 84 is positioned during the operation of motor 41 that displaces the pilot valve 40 and for this purpose operating member 84 may for example be suitably mechanically connected to the valve 40 for operation thereby. The opposed contacts 81, 82 are connected to a source of voltage 98 through an interlocking relay 86. The relay comprises an operating winding 87, operable arms 88, 89, and out contacts 90, 91. The contacts 90, 91 are normally engaged respectively by arms 88, 89. The conductor 92 connects opposed contact 82 and relay contact 90; a conductor 93 connects opposed contact 81 and relay contact 91. The source of voltage 98 may be a battery and a conductor 95 connects relay arm 88 to one terminal of the battery and a conductor 96 connects relay arm 89 to the opposite terminal of the battery. The battery 98 includes a grounded center tap conductor 99. Depending upon which contact is engaged by the arm 83 a fixed voltage for example of plus or minus 20 volts may be supplied to the control circuit from the synchronizing signal generator 80. This fixed voltage may be less than the indicated maximum voltage plus or minus 30 volts obtained from the signal generator 73.

Under ordinary operation where the craft departure from a datum is not large, the voltage from the signal generator 73 may be balanced by the fixed 20 volts output of the synchronizing signal generator 80. Thus on unbalance of the control circuit 71 by the signal generator 73 the amplifier 72 will cause operation of the motor 41 which in turn positions the pilot control valve 40. Operation of the valve through a small distance by the member 84 will move arm 83 to engage a contact to supply a fixed or step voltage control to the control circuit 71 which under ordinary circumstances is sufficient to unbalance the control circuit in the opposite direction to initiate reverse operation of the motor 41. However should the 20 volts control signal supplied from the synchronizing generator 80 be insufficient to cause opposite unbalance of the control circuit, the valve will be continued in its movement beyond the small displacement from its center position at which it may have engaged opposed contacts 81 or 82. The additional movement of the control valve will cause an operating member 100 also carried by the member 84 to engage, depending upon its direction of movement, either of opposed limit switches 101, 102 to open an engage circuit otherwise effective to introduce automatic control.

The actual automatic operation of the section 14 of the servomotor 11 depends on the operation of the motor 41. However to actually engage such automatic operation, fluid must be supplied to the pilot valve 40. The supply of fluid is regulated by the solenoid operated valve 65 which thus controls the engagement or introduction of the automatic control of section 14. A control circuit for effecting the energization of the solenoid valve operating means 66 is conditioned upon the energization of a monitoring or lockout relay 104 which has an operating winding 103 energized by a circuit extending from D.C. energized conductor 106, a manually operable single pole single throw engage switch 107 which is normally open, a conductor 108, limit or monitoring switches 101, 102, conductor 110, operating winding 103, to ground. Relay 104 includes a pair of operable arms 111, 112 which on energization of winding 103 engage respectively contacts 113, 114.

A circuit for energizing the valve operating means 66 now extends from energized conductor 108, a normally closed disengage switch 116, conductor 117, relay contact 114, relay arm 112, conductor 115, valve operating means 66, to ground. Upon operation of the solenoid valve 66 supply pressure from primary supply line 30 is permitted to flow to the secondary line 56 and thus to the pilot control valve 40 in section 14 of differential servomotor 11.

The operation of relay 104 to effect the engagement of relay arm 111 and contact 113 completes a circuit from energized conductor 117, relay contact 113, relay arm 111, conductor 118, through the operating winding 103 to provide a holding circuit for relay 104. A parallel circuit also extends from energized conductor 118, conductor 119, to operating winding 87 of interlocking relay 86. The operation of relay 86 disengages relay arms 88, 89 from their respective contacts 90, 91 to disconnect the synchronizing signal generator 80 from its voltage supply 98 so that no synchronizing voltage is supplied to control circuit 71 during the operation of the servo section 14. The holding circuit for the operating winding 103 of relay 104 permits the pilot valve 40 to operate to its extreme position in either direction to engage limit switches 101, or 102 which now have no effect on the energization of relay 104.

From the above, it will appear that the operation of the craft position changing means 18 may be effected by the differential servomotor from the manually operable controller 23 at all times. Further, the manual control from controller 23 may be supplemented by an autopilot control 70 which is manifested by the operation of the pilot valve 40 from the motorized means 41. The effective operation of valve 40 to control the power piston 50 was explained as dependent upon a supply of pressure fluid to the pilot valve, and the availability of the supply pressure is dependent upon the valve 40 initially not being in a maximum extreme position when it would operate limit switches 101, 102. Such extreme position may be occasioned by a malfunction in the control means for the motor 41 or may be due to an extreme departure from a datum position of the craft causing a large displacement of slider 74 in the signal generator 73 which would develop a signal in excess of the fixed signal supplied from the synchronizing signal generator 80. Consequently the introduction of automatic control at the time when the control valve 40 is at an extreme position would result in an immediate operation of the position changing device of the craft causing an undesired sudden change of position thereof. After the autopilot control is rendered effective by energization of relay 104, by manually closing switch 107, to thereby operate valve 65, the manual control from control column 23 is supplemented by the autopilot control. The autopilot control circuit 71, in response to the position sensor 76 controls section 14 of servomotor 11 to automatically stabilize the position of the craft. The stabilized position of the craft may be altered by the displacement of control column 23, during the combined operation of manual and automatic control. It will now be evident that to prevent such sudden change of position that there has been provided a novel control circuit synchronizing arrangement and system for monitoring the application of automatic control to a position changing device of a dirigible craft.

What is claimed is:

1. In an aircraft having attitude changing means for controlling the attitude thereof in combination: a hydraulic servomotor operating said attitude changing means; an attitude reference means; a balanceable control circuit means responsive to the attitude reference means and unbalanced when the craft deviates from a predetermined attitude; operable means including a control valve for said servomotor connected to said control circuit means and movable in response to unbalance thereof; and further means connected to the control circuit means and operated by said operable means and its movements in either direction from a normal position to apply a step control effect to said control circuit means opposing its response to the attitude means and normally in excess thereof to cause reverse movement of said operable means prior to supplying fluid pressure to said servomotor control valve.

2. The apparatus of claim 1; selective means for controlling the supply of operating fluid to said servomotor; and additional means in series with said selective means and controlled by said operable means in movement beyond that required for operating said further means to render said selective means ineffective to control the supply of fluid.

3. The apparatus of claim 2; and a subordinate controller connected to said selective means and operated upon effective operation of said selective means to maintain the effectiveness of the operation of the selective means irrespective of the subsequent movement of said operable means.

4. The apparatus of claim 3 wherein the hydraulic servomotor is characterized as a differential servomotor having two control sections and an output member and wherein said operable means comprises one control section of said motor.

5. In a dirigible craft having manually operable means for changing craft position, in combination: stabilizing means for also changing craft position comprising, a servomotor adapted to change craft position, a craft position responsive means, a control signal pickoff operated by said responsive means and supplying a control signal in accordance with the magnitude of the change in craft position, a balanceable control signal circuit means connected to said pickoff, a controller operated by said control circuit means on unbalance thereof, further signal providing means driven by said controller and connected to said control circuit means and supplying thereto a fixed signal opposing said pickoff signal, and selectively operable manual means interconnected with said controller and servomotor to effect operation of said servomotor from said controller.

6. The apparatus of claim 5, and means responsive to said controller and effective when said pickoff signal exceeds in magnitude said fixed signal to prevent effective operation of said selectively operable means.

7. In a condition control system having manually operable means for changing the condition, in combination: stabilizing means for additionally changing the condition upon departure thereof from a predetermined value comprising, a servomotor adapted to operate a condition changing device, a condition responsive means, a pickoff operated by said condition responsive means and supplying a control signal in accordance with the magnitude of change in the condition from a predetermined value, a balanceable signal control circuit connected to said pickoff, a controller means operated by said control circuit on unbalance thereof, further signal providing means driven by said controller means and connected to said control circuit and supplying thereto a fixed signal opposing said pickoff signal to oppositely unbalance said control circuit, selectively operable means to effect operation of said servomotor from said controller means, and further means in said selectively operable means responsive to said controller means on continued operation resulting when said pickoff signal exceeds in magnitude said fixed signal to prevent effective operation of said selectively operable means.

8. Control apparatus for an aircraft having manually operable means for changing craft position, said apparatus comprising: stabilizing means for also changing craft position including a servomotor means for changing craft position, a position responsive means, a pickoff operated by said responsive means and supplying a control signal in accordance with the magnitude of the change in position, a balanceable control circuit means connected to said pickoff, a controller operated by said control circuit means on unbalance of said control circuit, further means driven by said controller on limited operation thereof and connected to said control circuit and supplying thereto a fixed signal opposing said pickoff signal and normally in excess thereof to oppositely unbalance said control circuit means, selectively operable means to effect operation of said servomotor from said controller, and lock-out means in said selectively operable means effective when said controller operation exceeds said limited operation to prevent operation of said selectively operable means.

9. Control apparatus for an aircraft comprising: a servomotor, a condition responsive means, a pickoff operated by said responsive means and supplying a control signal in accordance with magnitude in the change in condition, a balanceable control circuit connected to said pickoff, an amplifier having control electrodes connected to said control circuit and operable on unbalance of said circuit, displaceable further means controlled by said amplifier and connected to said control circuit and controlling on displacement thereof application of a fixed signal opposing said pickoff signal and normally exceeding said pick-off signal upon limited displacement of said further means, selectively operable means to effect operation of said servomotor from said amplifier, and interlocking means operatively connected with said selectively operable means and effective when said further means displacement exceeds the limited displacement to prevent operation of said selectively operable means.

10. Control apparatus for an aircraft having a device for changing craft position, said apparatus comprising; a hydraulic servomotor adapted to position said device said servomotor including a displaceable control valve; a position responsive means; a pickoff operated by said responsive means and supplying a control signal in accordance with the magnitude of the change in position of said craft; a balanceable control circuit connected to said pickoff and unbalanced by operation thereof; a controller including said control valve operated by said control circuit on unbalance of said circuit; further signal providing means driven by said controller on limited displacement thereof and connected to said control circuit for supplying thereto a fixed signal opposing said pickoff signal and exceeding it to balance and then oppositely unbalance said circuit to terminate or cause reverse operation of said controller; and manually operable selective means interconecting said control valve and a source of fluid effective in operated position to permit a supply of fluid to said control valve of said servomotor.

11. The apparatus of claim 10, and additional means responsive to the controller and operatively connected to said selective means effective when said controller displacement exceeds said limited displacement whereby said pickoff signal exceeds in magnitude said fixed signal, to prevent operation of said selectively operable means.

12. Control apparatus for an aircraft having a position changing device, said apparatus comprising; a hydraulic servomotor adapted to position said device said servomotor having an operable control valve; a position responsive means; a pickoff operated by said responsive means and supplying a control signal increasing in accordance with the magnitude of the change in craft position; a balanceable control circuit connected to said pickoff; a controller including said control valve connected to said circuit and operated by said control circuit on unbalance thereof; further displaceable means driven by said controller on limited operation thereof and connected to said control circuit and controlling application thereto of a fixed signal opposing said pickoff signal and normally equaling or exceeding it in magnitude to terminate or cause reverse operation of said controller; a supply valve in a conduit connecting said valve and a supply effective in operated position to permit a supply of fluid to said control valve; and selectively operable means operating said supply valve.

13. The apparatus of claim 12; and lockout means interconnected with said controller and selectively operable means responsive to said controller and effective when said controller operation exceeds said predetermined magnitude to prevent effective operation of said supply valve by said selectively operable means.

14. In a control system having a device for controlling a condition: a hydraulic servomotor adapted to operate said device; a movable controller valve reversibly operating said servomotor; selectively operable circuit responsive means for connecting said servomotor and valve to an operating source; operating means having a balanceable circuit and on unbalance thereof actuating said controller valve; means responsive to movement of said controller valve beyond a predetermined limit during a preliminary period to prevent operation of said operable circuit responsive means, and further means connected to said circuit and operated by said controller valve during its movement within such predetermined limit in such period to oppose any unbalance in said balanceable circuit.

15. In a control system for an aircraft having a control surface for changing craft attitude: a hydraulic servomotor including a control valve for positioning said control surface; an oscillatable servomotor valve position controller displaceable in either direction from a normal position; a balanceable control means operating said servomotor valve controller on unbalance; switch means operated by said valve position controller; and means in the control means controlled by said switch means to reduce the unbalance in said balanceable control means.

16. In an aircraft having operable means for controlling the attitude thereof, apparatus for operating said operable means including a hydraulic servomotor; an attitude reference means; a balanceable control signal circuit responsive to the attitude means and unbalanced when the craft deviates from a predetermined attitude; a servomotor controller, comprising a displaceable valve, connected to said control circuit and movable in either direction from a normal position, both prior to permissive operation of said servomotor and during permissive operation of said servomotor, in response to unbalance of said control circuit; and further means operated by said controller valve during its movement prior to permissive operation of said servomotor to apply a step control signal to said control circuit opposing the response of the circuit to the attitude means to effect a reverse movement of said controller; and means to render displacements of said valve effective on said servomotor to provide permissive operation thereof.

17. In apparatus for controlling the position of a dirigible craft, in combination: position responsive means for producing a first control signal varying in response to variations in position of said craft from a datum; operable means for producing a "step" control signal opposing said first control signal; control means having an input section and an output section with its input section connected to the position responsive means and operable means and thus responsive to both said control signals and its output section adjusting said operable means; a motor adapted to change the position of said craft; further means enabling effective control of said motor by said control means; follow-up means operated by said motor to supply a rebalance signal to said control means; and additional means controlled by said further means to render said operable means ineffective on said control means.

18. In apparatus for controlling a condition, in combination: means comprising differential means having two input members and an output member for controlling said condition; manually operable means connected to one input member of said differential means; a balanceable control means; condition responsive means operating said balanceable control means to unbalance it on change in the condition; synchronizing means providing a "step" operation to said control means in opposition to said responsive means to effect opposite unbalance of said control means and in turn operated by said control means; selective means; monitoring means for said control means responsive to the condition of balance of said control means and interconnected with said second differential input member and synchronizing means for rendering effective control of said second differential input member from said control means on subsequent unbalance of said control means and additionally rendering said synchronizing means simultaneously ineffective on said control means on operation of said selective means.

19. In a control system having a device for changing a condition, in combination: a hydraulic servomotor adapted to position said device and having a control valve; a condition responsive means; a signal providing pickoff operated by said condition responsive means and supplying a D.C. control signal in accordance with the magnitude of the change in said condition; a balanceable D.C. control circuit connected to said pickoff; a controller means including said valve operated by said balanceable control circuit on unbalance of said circuit; further means driven by said controller means on operation thereof and connected to said control circuit and supplying thereto a fixed D.C. signal opposing said pickoff signal on limited displacement of said controller means valve; selectively operable means effective when in operated position to pass a supply of fluid to said control valve whereby displacements thereof effect operation of said servomotor; and additional means operatively connected with said controller means and effective within said limited displacement of said controller means valve, operating said selectively operable means.

References Cited in the file of this patent

UNITED STATES PATENTS

| | | |
|---|---|---|
| 2,654,061 | Gille | Sept. 29, 1953 |
| 2,740,082 | Sedgfield | Nov. 27, 1956 |